United States Patent [19]
Lester

[11] Patent Number: 6,000,255
[45] Date of Patent: Dec. 14, 1999

[54] ANTI-THEFT DEVICE FOR ALL-TERRAIN VEHICLES

[76] Inventor: Terry Lee Lester, HC 72, Box 124, Gilbert, W. Va. 25621

[21] Appl. No.: 09/191,097

[22] Filed: Nov. 12, 1998

[51] Int. Cl.$^6$ .................................................. B60R 25/00
[52] U.S. Cl. ................................ 70/226; 70/234; 70/237; 211/5; 410/7; 410/9; 410/22
[58] Field of Search ....................... 70/19, 237, 225–228, 70/234, 235; 188/4 R, 32, 265; 211/5; 410/7, 8, 9, 19, 22

[56] References Cited

U.S. PATENT DOCUMENTS

| | | | |
|---|---|---|---|
| 1,277,113 | 8/1918 | Petersen | 70/228 |
| 1,453,566 | 5/1923 | Jeffries | 224/42.25 |
| 1,488,893 | 4/1924 | Plouffe | 70/226 |
| 1,504,220 | 8/1924 | Degen | 70/227 |
| 3,581,846 | 6/1971 | Janus | 410/19 X |
| 4,312,452 | 1/1982 | Waier | 70/237 X |
| 4,399,893 | 8/1983 | Switzer | 410/19 X |
| 4,819,462 | 4/1989 | Apsell | 70/14 |
| 4,871,291 | 10/1989 | Moore et al. | 410/19 X |
| 5,106,245 | 4/1992 | Fritz et al. | 410/9 |
| 5,214,944 | 6/1993 | Wolthoff | 70/226 |
| 5,375,442 | 12/1994 | Hammer | 70/226 |
| 5,593,260 | 1/1997 | Zimmerman | 410/20 |
| 5,724,839 | 3/1998 | Thering | 70/18 |

*Primary Examiner*—Lloyd A. Gall
*Attorney, Agent, or Firm*—Monika J. Hussell

[57] ABSTRACT

An anti-theft device for all-terrain vehicles comprising a hollow frame upon which the front or rear wheels of a vehicle rest, said frame being secured to a stable surface, locking structure substantially embedded within the frame, two slidable members engaged with the locking structure, and two wheel engaging end members affixed to the exposed end of said slidable members, which wheel engaging end members press against the wheel hubs of a vehicle thereby prohibiting removal of the vehicle from the stable surface when the locking structure is engaged.

11 Claims, 3 Drawing Sheets

ANTI-THEFT DEVICE FOR ALL-TERRAIN VEHICLES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable

BACKGROUND OF THE INVENTION

The present invention relates to an anti-theft device which secures two wheels of an all-terrain vehicle and other vehicles and trailers to a stable surface. In particular, the present invention relates to an apparatus which secures an all-terrain vehicle to a stable surface by locking the front or rear wheels of the vehicle to the apparatus when the wheels are mounted on top of the apparatus and the apparatus is fixed to a stable surface, thereby prohibiting unauthorized movement of the vehicle either by its own power or by lifting the vehicle onto the bed of a truck or into a trailer for transportation.

All-terrain vehicles are one of the most popular recreational vehicles used in the United States. Over 476,000 all-terrain vehicles are expected to be sold to U.S. consumers in 1998 alone. The retail price of all-terrain vehicles ranges from $5,000 to $7,000. Due to the average weight of an all-terrain vehicle, approximately 400–500 pounds, the vehicles are capable of being lifted by individuals onto the bed of a truck for transportation and removed therefrom for use and storage. While the weight of the vehicle permits such human lifting, it also permits theft notwithstanding the current locking devices in the industry.

Currently, vehicles such as all terrain vehicles are locked using devices which prohibit a would-be thief from driving the all-terrain vehicle or similar vehicle without dismantling the locking device. The most common examples of these devices prohibit the full rotation of a vehicle's wheels, whereby the wheels are locked together or independently with a device which at some point in the rotation of the wheels interacts with the structure of the vehicle thereby prohibiting further rotation of the wheels. Other examples of locking devices for all terrain vehicles or other vehicles prohibit substantial rotation of the steering column of the vehicle, the most popular of which is The Club®. Therefore, the current locking devices on the market prohibit thieves from transporting the vehicle by its own power without removing the locking device.

Specific examples of prior art currently used for securing all-terrain vehicles include inventions disclosed in the following U.S. patents. U.S. Pat. No. 5,724,839 (Thering) discloses locking means which prohibit the complete rotation of the tires of a vehicle. The invention disclosed in '839 comprises end clamps which fit on the outside rim of a wheel and the outside surface of a tire. Said end clamps fit into two horizontally extendable and connected rods or bars which project across the width of the vehicle or wheel base, and a locking mechanism which comprises in part an exposed padlock.

U.S. Pat. No. 5,375,442 (Hammer) discloses a clamp assembly used to prevent a wheel from effectively rotating, whereby the invention disclosed therein partially surrounds the wheel of a vehicle and upon rotation of the wheel will engage in the undercarriage of the vehicle, prohibiting further rotation of the wheel. The '442 locking mechanism comprises in part a padlock, combination lock or other type of conventional locking mechanism which is attached within a lock casing to limit the unauthorized removal thereof.

U.S. Pat. No. 4,819,462 (Apsell) discloses a clamp assembly which comprises a device partially surrounding the wheel of a vehicle and intended to prohibit full rotation of the wheel, whereby the locking device disclosed therein includes a padlock or similar lock which is engaged so as to prevent the insertion of lock cutters.

U.S. Pat. No. 5,593,260 (Zimmerman) discloses an apparatus for securing a single wheel of an ATV to a trailer. The invention disclosed in the '260 patent comprises a cylindrical sleeve fastened to a trailer, two wheel stop bars perpendicularly connected to said cylindrical sleeve, two lift bars attached to the cylindrical sleeve and chains attached to the other ends of said bars. When the wheel of an ATV is strategically moved into the apparatus as described in the '260 patent, the user need only lift the chains (thereby lifting the lift bars) and secure them to the stop bar, prohibiting substantial movement of the vehicle during transportation. The apparatus disclosed in the '260 patent is not intended to lock the device, and even if a locking mechanism was incorporated into the apparatus, it would be obvious to one skilled in the art that the apparatus could easily be dismantled by cutting through the chains.

Due to the weight of an all terrain vehicle and the resulting fact that ATVs can be lifted by human strength, these locking devices only prohibit a thief from moving the vehicle under its own power without disengaging the locking device, but fail to prohibit a thief from moving the ATV by lifting it onto the flat bed of a truck or the back of a trailer. Further, the locking devices of many of these inventions consist of padlocks and chains or other exposed locks which can be easily disengaged by simple cutting techniques. To date, there is no product on the market which locks an all terrain vehicle to a stable surface, i.e., the bed of a truck, a cement pad or otherwise.

Thus, there is a need for an apparatus which can lock an all-terrain vehicle to a stable surface when not in use. Further, there is a need for an apparatus which has embedded locking means which cannot be easily disengaged by thieves.

BRIEF SUMMARY OF THE INVENTION

It is an object of this invention to provide vehicle locking means that can be used on all-terrain vehicles. It is also an object of this invention to provide vehicle locking means whereby the locking mechanism is embedded in the structure of said locking means. It is a further object of this invention to provide vehicle locking means which are fixed to a stable surface to prevent theft of an all-terrain vehicle while the locking means are engaged.

The present invention is an apparatus which satisfies all of these objects. Specifically, the apparatus secures an all-terrain vehicle to a stable surface by locking two of its wheels to said apparatus which is fixed to the stable surface. Further, the locking mechanism on said apparatus is embedded therein so as to limit accessability to would-be thieves. The apparatus includes a frame support system capable of being secured to a stable surface, with means for locking the front or rear wheels of a vehicle to said system when the wheels are mounted on the apparatus.

The frame support system of the present invention comprises a hollow frame affixed to a stable surface to support a vehicle when its wheels are mounted on top of said frame. The hollow frame further having ramps to permit the wheels of the vehicle to be driven onto the frame. Locking means are affixed substantially within said frame, with the surface of the lock being the only exposed portion of said locking means. Two slidable end members slide within the opposite ends of said frame and mechanically engage and disengage with the locking means. Two wheel engaging members are affixed substantially perpendicular to the exposed ends of the slidable end members, and include a ring assembly intended to rest against the external frame of the hubs of the wheels mounted on the frame so as to prohibit movement thereof when the slidable members are engaged with the locking means.

The present invention thereby (1) secures the vehicle to a stable surface by locking its wheels to the frame support system which is affixed to the stable surface; and (2) prevents manipulation of the lock by embedding it within the system so that the only exposed portion is the face thereof.

DETAILED DESCRIPTION OF THE INVENTION

Figure 1:
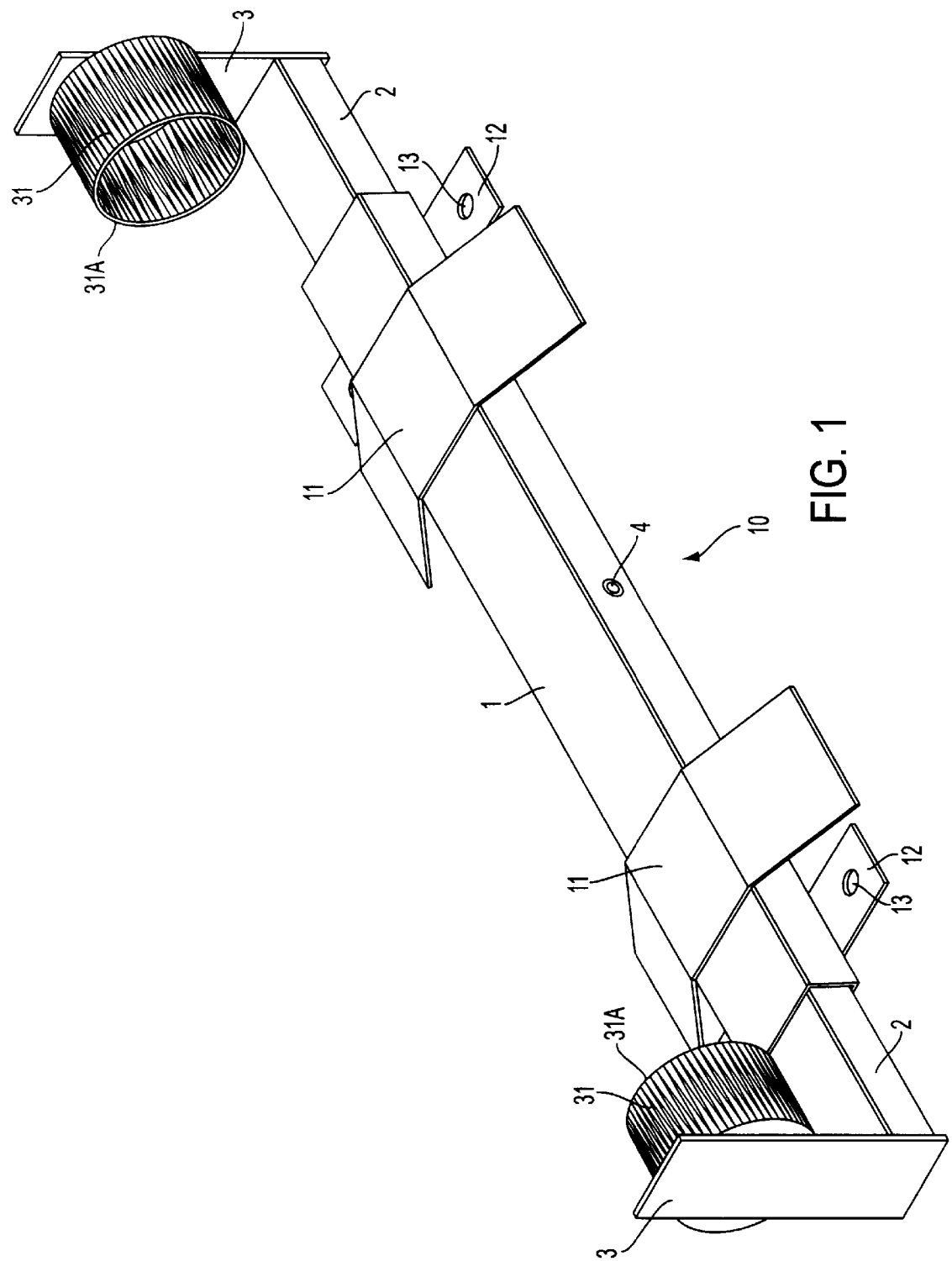
FIG. 1 is a perspective view of a preferred embodiment of the present invention.

The present invention encompasses an anti-theft device for securing the front or rear wheels of an all-terrain vehicle and other vehicles and trailers to a wooden or cement flooring, the bed of a truck or other fixed surface. Generally, the present invention comprises a hollow frame 1 affixed to a stable surface 10; two hollow slidable members 2 which partially slide within the hollow portion of said frame 1; wheel engaging end members 3 perpendicularly fixed to the exposed end of each of said slidable members 2, which end members 3 are comprised in part of a ring assembly 31, the exposed end 31A of which is intended to rest on the wheel hubs of a vehicle; and locking means 4 fixed on one interior side of, and extending through said side of, the frame 1, which locking means 4 locks and releases said slidable members 2 into place within the frame 1.

Your inventor prefers to use 3/16" steel rectangular tubing for said hollow frame 1, however it can be appreciated by one skilled in the art that any metal or other material able to support the partial weight of a vehicle and the changes in temperature associated with the region in which the device is to be used can be utilized (including but not limited to certain types of aluminum such as grade 6061 aluminum).

Referring to FIG. 1, the hollow frame 1 preferably includes two stabilizer cross supports 11 affixed to the top thereof, oriented perpendicular to the length thereof and positioned so that when the front or rear wheels of an all-terrain vehicle are mounted on the device, said wheels each rest on one of said cross supports 11. The stabilizer cross supports 11 are plane with the top surface of frame 1 and then slope toward the surface 10 on either or both sides of the frame 1 to create a ramp or ramps which will support the vehicle and permit the front or rear wheels thereof to be driven onto the apparatus. Alternatively, the stabilizer cross supports 11 may slope on one end away from the surface 10 to inhibit movement of the vehicle beyond the frame 1. In this manner, the stabilizer cross supports 11 provide support for ease of mounting the front or rear wheels of a vehicle onto the hollow frame 1 and prevent the device of the present invention from shifting or tipping when the wheels of a vehicle are driven onto the device. The length and width of cross supports 11 may vary to accommodate the height of the frame 1 and different tire widths. Your inventor prefers to use 1/4" plate steel for the cross supports 11, although it would be appreciated by one skilled in the art that any material having the necessary strength requirements to support the partial weight of a vehicle and withstand changes in temperature can be used.

Most preferably, the hollow frame 1 is affixed to the stable surface by at least two crossbars 12. Said crossbars 12 are affixed to the underside of frame 1 (by spot welding or any other method of secure connection), and are located substantially equidistant from the center of said frame 1, within the last linear foot of the ends of frame 1 and perpendicular to the length of frame 1. Each of said crossbars 12 having at least two apperatures 13 on opposite ends thereof to permit a screw, bolt or other similar securing device to affix the crossbars 12 to the surface 10. Said securing device may be any of the commercially available bolts of sufficient strength, size and length depending on the mounting requirements dictated by stable surface 10, and should preferably possess a recessed or allen type head that may be filled with an epoxy resin upon installation to deter removal of said securing device. Your inventor prefers to use 3/8" steel plate for crossbars 12, although it would be appreciated by one skilled in the art that similar materials having the necessary strength and elasticity requirements can be used.

The hollow frame 1 is specifically disposed and adapted to allow sliding reception therein of hollow slidable members 2 which are preferably constructed of 3/16" steel rectangular tubing. It would be appreciated by one skilled in the art that said slidable members 2 may be constructed from materials substantially equivalent in strength to said material preferred by your inventor. The slidable members 2 must be sufficient length to engage with the locking means 4 while the exposed end 31A of the ring assembly 31 rest on the wheel hubs of the vehicle.

Figure 2:
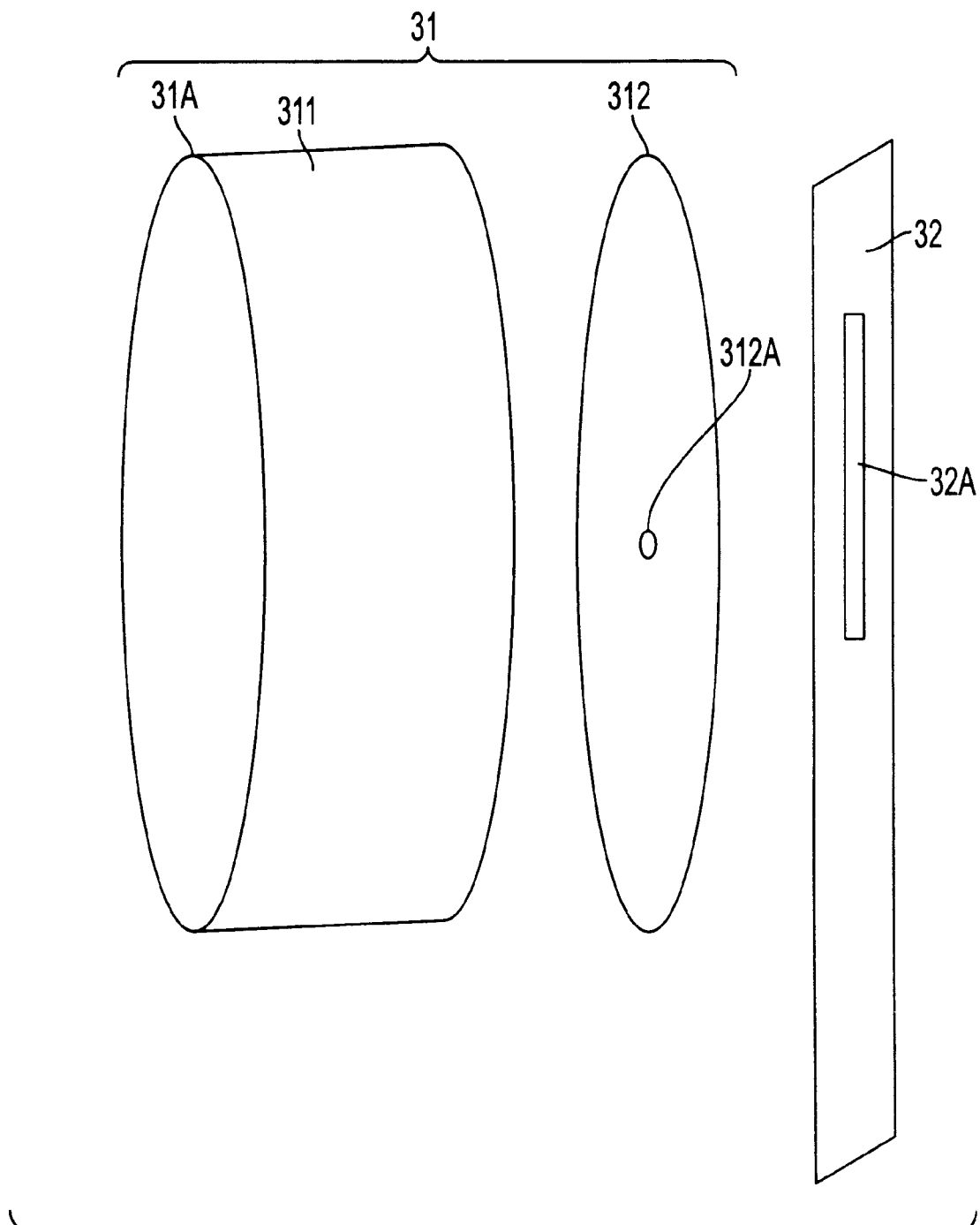
FIG. 2 is a side view of a preferred embodiment of the dismantled wheel engaging end member of the present invention.

A wheel engaging end member 3 is affixed to the exposed ends of each of the hollow slidable members 2. Referring to FIG. 2, said end member 3 preferably comprises a member 32, one end of which is affixed to the exposed end of said slidable member 2, and a ring assembly 31, which is either affixed or movably engaged with the other end of said member 32 at the height necessary for the exposed end 31A thereof to be aligned with the wheel hub of a wheel mounted on the hollow frame 1. Said member 32 can consist of metal plate, c-channel or rectangular tubing. The ring assembly 31 preferably comprises a hollow metal pipe 311 affixed to a circular plate 312 by welding or other means. The metal pipe 311 shall have a diameter sufficient to allow the exposed end 31A of said metal pipe 311 to press against the wheel hub when the wheels of a vehicle are mounted on the hollow frame 1. Your inventor prefers to use a 1/4" metal pipe with a 6" diameter. Said circular plate 312 shall have a diameter equal to either the inner or outer diameter of the metal pipe 311 and shall be either affixed to or movably engaged with the upper end of the member 32.

To affix said metal plate 312 to the member 32, your inventor prefers to use a threaded securing device such as a screw passing first through a threaded hole 312A in the circular plate 312 and a similar threaded hole in said member 32. When affixed, the exposed end of the securing device protruding through said member 32 should be cut at or near the external surface of the member 32 if said member 32 is a metal plate or c-channel. If said member 32 is rectangular tubing, said securing device should pass through only the side of said member 32 which said plate 312 is affixed to, and not through the entire tubing. Alternatively, the plate 312 can be affixed to the member 32 by welding or other similar techniques.

To permit movable engagement of said plate 312 with said end member 32, your inventor prefers to cut or mold a channel 32A in said member 32, and use a threaded securing device passing first through said threaded hole 312A and then through said channel 32A at the height necessary to permit the exposed end 31A of the ring assembly 31 to press against the wheel hub of the corresponding wheel when mounted on the frame 1. Said securing device is then locked in place by a nut or other means to permit manipulation of said securing device from the interior side of plate 312 only. The channel 32A of said member 32 shall preferably have a minimum ⅜" width and variable height depending on the range of radii of tires used on all-terrain vehicles and the height of hollow frame 1.

Figure 3:
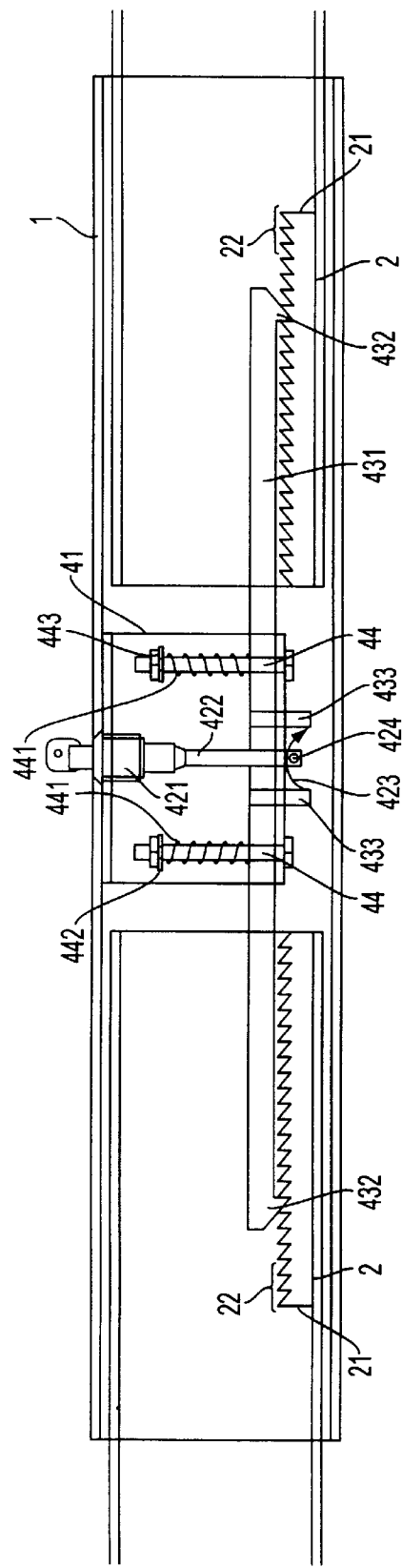
FIG. 3 is a top view of a preferred embodiment of the locking apparatus of the present invention.

As depicted in FIG. 3, your inventor most prefers the locking means 4 to comprise a hollow tubing box 41, a locking mechanism traversing through said tubing box 41, and a release mechanism mechanically engaged with said locking mechanism and the slidable members 2. Said tubing box 41 is of sufficient size to be affixed to an interior side of the frame 1 while permitting the release mechanism to engage and disengage with the slidable members 2. Your inventor has constructed the tubing box 41 with dimensions of 4"×2"×4", however one skilled in the art would appreciate that these dimensions could vary depending on the size of the components of the locking means 4 and other components engaging with the locking means 4.

Said locking mechanism comprises a fort or cam lock 421 mechanically engaged with a cylindrical pipe 422, a washer 423 placed on the lower portion of said cylindrical pipe 422, and a roll pin inserted through a pin hole 424 in said cylindrical pipe 422 to secure said washer 423 on said pipe 422. The frame 1 and tubing box 41 having an aperture to accommodate said fort lock 421 so that the exposed key-lock portion of said fort lock 421 is plane with the exterior surface of frame 1. Said tubing box 41 further having an aperture at the opposite end to permit said cylindrical pipe 422 to pass freely through said tubing box 41.

The cylindrical pipe 422 is molded or manipulated to be flat on two sides at the end extending through said tubing box 41 sufficient to permit placement of the washer 423 and the roll pin on said flat portion and outside of said tubing box 41. Said washer 423 having a hollow center with slightly larger dimensions and an identical shape as the flat portion of the cylindrical pipe 422 so as to fit snugly on said pipe 422, and being manipulated to angle away from said tubing box 41 on two sides but not to interfere with said roll pin.

The release mechanism comprises a release bar 431 which passes through the hollow portion of the tubing box 41, said release bar 431 having engaging ends 432, and a block 21 affixed on an internal side of slidable members 2 as depicted in FIG. 3. Said block 21 shall have a width no greater than the interior height of said slidable members 2, and the placement and length thereof shall be sufficient so as to engage with locking means 4 as hereinafter described while the exposed end 31A of the ring assembly 31 rest on the wheel hubs of the vehicle. Said block 21 further having jagged edges 22 carved or molded into the side thereof, which edges correspond with the size and shape of the engaging ends 432 of the release bar 431. Said release mechanism further having two ¼" metal dowels 433 partially press fitted into said release bar 431 with a portion thereof extending beyond said release bar 431 and through additional apertures in said tubing box 41. The exposed length and location of said dowels 433 shall be sufficient to permit the angled ends of the washer 423, when said washer is rotated by means of the locking mechanism, to force said dowels 433 (and thereby force said release bar 431) up or down, permitting the engagement or disengagement of the release bar engaging ends 432 with the jagged edges 22 of the slidable members 2. Said release bar 431 further having an aperture to permit the cylindrical pipe 422 to move freely through said release bar 431.

Said release bar 431 is movably attached to said tubing box 41 by means of two ¼" bolts 44, each having a 1⅝" spring 441, a ¾" recessed washer 442 of sufficient diameter to cap the spring 441, and a nut 443 affixed to the end of each of said bolts 44. Said bolts 44 pass through apertures in said tubing box 41 and then apertures in said release bar 431, with said springs 441 resting on said release bar 431, and said washers 442 and nuts 443 capping said springs. This bolt arrangement permits limited upward movement of said release bar 431 as necessary to engage and disengage the engaging ends 432 of the release bar 431 with the jagged edges 22 of slidable members 2 by means of the dowel 433 and washer 423 arrangement, while otherwise applying sufficient pressure on said release bar 431 to maintain its place in the locked position.

In operation, the preferred embodiment of the apparatus of the present invention is used by securing hollow frame 1 to the stable surface 10 using securing devices interjected into the holes 13 of the crossbars 12, and proceeding into the stable surface 10. In its open position, the slidable members 2 are extended outwards from the frame 1 to permit the front or rear wheels of a vehicle to drive onto the frame 1 without interference, while the locking means 4 is open or unlocked (the engaging ends 432 of the release bar 431 are not engaged with the jagged edged 22 of the internal block 21 of the slidable members 2). The front or rear wheels of a vehicle are then squarely driven onto the frame 1 via the stabilizing cross supports 11, causing the tires and the wheel hubs to be positioned correspondingly to the rings 31. The slidable base members 2 are then manually pushed together until the rings 31 on the end members 3 are pressed against the innermost exterior portion of the wheel hubs of the vehicle. The fort lock 421 is then rotated (by means of a key) to engage the locking means 4 (by rotating the cylindrical pipe 422 and washer 423 assembly, thereby releasing the dowels 433 and permitting the springs 441 to force the release bar 431 and the engaging ends 432 thereof to engage with the jagged edges 22 of the slidable members 2), thereby preventing the wheels of the vehicle from moving and preventing the vehicle from being moved either by its own power or by manual lifting by thieves.

I claim:

1. An anti-theft device for all-terrain vehicles, other vehicles and trailers comprising:

A. a hollow frame, fixedly mounted on a stable support surface, adapted to support the weight of opposed front or rear wheels of a vehicle when said wheels are mounted on said frame;

B. locking means embedded substantially within said frame;

C. two slidable end members capable of sliding within the opposite ends of said hollow frame and which mechanically engage and disengage with said locking means; and D. two wheel engaging end members fixed perpendicularly to the exposed end of said slidable members and which restrict movement of said wheels when said locking means are engaged with said slidable members.

2. The device claimed in claim 1, where the hollow frame comprises a rectangular tubing and two stabilizer cross supports fixedly mounted to the top of said tubing, oriented perpendicularly to the length of said tubing, and angled toward the stable surface on at least one end of said cross supports to permit the wheels of a vehicle to be driven onto said hollow frame.

3. The device claimed in claim 2, where the hollow frame is affixed to the stable surface by two crossbars fixedly mounted to the underside of said frame wherein said crossbars have at least two apperatures on opposite ends thereof to permit securing devices to affix said crossbars to said surface.

4. The device claimed in claim 2, where said locking means comprise a hollow tubing box affixed to the interior side of the hollow frame, a locking mechanism traversing through said tubing box and hollow frame and a release mechanism mechanically engaged with said locking mechanism and the slidable members.

5. The device claimed in claim 4, where said locking mechanism comprises:

A. a cam lock,

B. a cylindrical pipe mechanically engaged with said fort lock, which cylindrical pipe passes through an aperture in said tubing box and is molded or manipulated to be flat on two sides at an end extending through said tubing box, C. a washer placed on the lower portion of said cylindrical pipe, outside of said tubing box, which washer has a hollow center with slightly larger dimensions and an identical shape as the flat portion of the cylindrical pipe, and being angled away from said tubing box on two sides, and D. a roll pin inserted through a pin hole in said cylindrical pipe to secure said washer on said pipe; and said release mechanism comprises:

A. a release bar which passes through the hollow portion of the tubing box, said release bar having engaging ends, B. a block affixed on an internal side of each of said slidable members, said blocks having jagged edges carved or molded into the side thereof which edges correspond with the size and shape of said engaging ends, C. two metal dowels partially press-fitted into said release bar, a portion thereof extending beyond said release bar and through additional apertures in said tubing box;

where said release bar is movably attached to said tubing box by means of two bolts, each having a spring, a recessed washer of sufficient diameter to cap the spring, and a nut affixed to the end of each of said bolts, said bolts passing through additional apperatures in said tubing box and apertures in said release bar.

6. The device claimed in claim 2 wherein the wheel engaging end members comprise:

A. a member, one end of which is affixed to the exposed end of said slidable member, and B. a ring assembly which is engaged with the other end of said member comprising
1. a hollow metal pipe having a diameter sufficient to allow the exposed end of said metal pipe to press against the wheel hub when the wheels of a vehicle are mounted on the hollow frame, and
2. a circular plate engaged with said hollow metal pipe and the other end of said member.

7. The device claimed in claim 2 wherein the wheel engaging end members comprise:

A. a member, one end of which is affixed to the exposed end of said slidable member, and B. a ring assembly which is engaged with the other end of said member comprising
1. a hollow metal pipe having a diameter sufficient to allow the exposed end of said metal pipe to press against the wheel hub when the wheels of a vehicle are mounted on the hollow frame, and
2. a circular plate engaged with said hollow metal pipe and engaged with the other end of said member.

8. The device claimed in claim 4 wherein the wheel engaging end members comprise:

A. a member, one end of which is affixed to the exposed end of said slidable member, and B. a ring assembly which is engaged with the other end of said member comprising
1. a hollow metal pipe having a diameter sufficient to allow the exposed end of said metal pipe to press against the wheel hub when the wheels of a vehicle are mounted on the hollow frame, and
2. a circular plate engaged with said hollow metal pipe and the other end of said member.

9. The device claimed in claim 4 wherein the wheel engaging end members comprise:

A. a member, one end of which is affixed to the exposed end of said slidable member, and B. a ring assembly which is engaged with the other end of said member comprising
1. a hollow metal pipe having a diameter sufficient to allow the exposed end of said metal pipe to press against the wheel hub when the wheels of a vehicle are mounted on the hollow frame, and
2. a circular plate engaged with said hollow metal pipe and engaged with the other end of said member.

10. The device claimed in claim 5 wherein the wheel engaging end members comprise:

A. a member, one end of which is affixed to the exposed end of said slidable member, and B. a ring assembly which is engaged with the other end of said member comprising
1. a hollow metal pipe having a diameter sufficient to allow the exposed end of said metal pipe to press against the wheel hub when the wheels of a vehicle are mounted on the hollow frame, and
2. a circular plate engaged with said hollow metal pipe and the other end of said member.

11. The device claimed in claim 5 wherein the wheel engaging end members comprise:

A. a member, one end of which is affixed to the exposed end of said slidable member, and B. a ring assembly which is engaged with the other end of said member comprising
1. a hollow metal pipe having a diameter sufficient to allow the exposed end of said metal pipe to press against the wheel hub when the wheels of a vehicle are mounted on the hollow frame, and
2. a circular plate engaged with said hollow metal pipe and engaged with the other end of said member.

* * * * *